United States Patent [19]

Hong

[11] Patent Number: 5,142,367

[45] Date of Patent: Aug. 25, 1992

[54] SYSTEM FOR DIVISIONALLY DISPLAYING PLURAL IMAGES ON A SCREEN

[75] Inventor: Sam P. Hong, Kyungsangbook, Rep. of Korea

[73] Assignee: Goldstar Co., Ltd., Seoul, Rep. of Korea

[21] Appl. No.: 627,263

[22] Filed: Dec. 14, 1990

[30] Foreign Application Priority Data

Dec. 15, 1989 [KR] Rep. of Korea ............... 18655/1989

[51] Int. Cl.5 ........................................... H04N 5/45
[52] U.S. Cl. ................................... 358/183; 358/108
[58] Field of Search ................. 358/22, 183, 140, 108, 358/85

[56] References Cited

U.S. PATENT DOCUMENTS

| | | | |
|---|---|---|---|
| 4,507,683 | 3/1985 | Breisshaber et al. ........... 358/108 X |
| 4,772,945 | 9/1988 | Tagawa .............................. 358/108 |
| 4,931,872 | 6/1990 | Stoddard et al. ................. 358/85 X |
| 4,994,916 | 2/1991 | Pshtissky et al. ............... 358/108 X |
| 5,019,905 | 5/1991 | Pshtissky et al. ............... 358/108 X |

*Primary Examiner*—James J. Groody
*Assistant Examiner*—Mark R. Powell
*Attorney, Agent, or Firm*—Rosen, Dainow & Jacobs

[57] ABSTRACT

A system for divisionally displaying plural images on a monitor screen and capable of displaying video signals inputted from four monitoring cameras on one screen by dividing in four parts and of recording one signal out of the signals being displayed on one screen divided in four or video signals being directly inputted from video cameras. The system includes first to four video signal processing sections for processing four camera video signals, synchronous generator for producing synchronous signal and color burst signal, an ON-screen generator, digital/analog converters for converting the output signals of the video signal processing sections and the ON-screen generator, and an encoder for synthesizing the output signals of the digital/analog converters with the synchronous signals and color burst signal of the synchronous generator.

4 Claims, 2 Drawing Sheets

SYSTEM FOR DIVISIONALLY DISPLAYING PLURAL IMAGES ON A SCREEN

BACKGROUND OF THE INVENTION

The present invention relates to a display system which processes and displays video signals which are inputted from video cameras, and more particularly to a divisional display system for a screen divided in four, which enables video signals which are inputted from four video cameras to be divisionally displayed on one television receiver or one monitor in a monitoring system.

In a conventional monitoring system, it was impossible to display video signals inputted from several video cameras on one television receiver or one monitor at the same time by dividing the video signals. As a result, video signals inputted from several monitoring cameras have to be displayed on respective television receivers or monitors, so that it is difficult to obtain an effective monitoring against desired places, and as television receivers or monitors as much as monitoring cameras are required it is not economical for users.

SUMMARY OF THE INVENTION

Accordingly, it is an object of the present invention to provide a system for divisionally displaying multiple screens and which is capable of displaying video signals inputted from four monitoring cameras on one television receiver or one monitor by dividing in four parts at the same time so that more effective monitoring is obtainable.

Another object of the present invention is to provide a divisional display system four-screen system which is capable of selecting and recording one out of the video signals being displayed at the same time by dividing in four parts of the video signals being inputted from each of the monitoring cameras.

To accomplish the above objects, the divisional display four-screen system of the present invention is constituted such that video signals inputted from four monitoring video cameras are processed and stored as digital signals, respectively, and outputted in the order corresponding to four divisional regions, the output signals are processed to analog signals to obtain synthetic video signals and then applied to a television receiver, one signal out of the video signals being inputted from said four monitoring cameras is selected, and one signal out of the selected signal of the signals being applied to the television receiver is stored as a recording signal.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
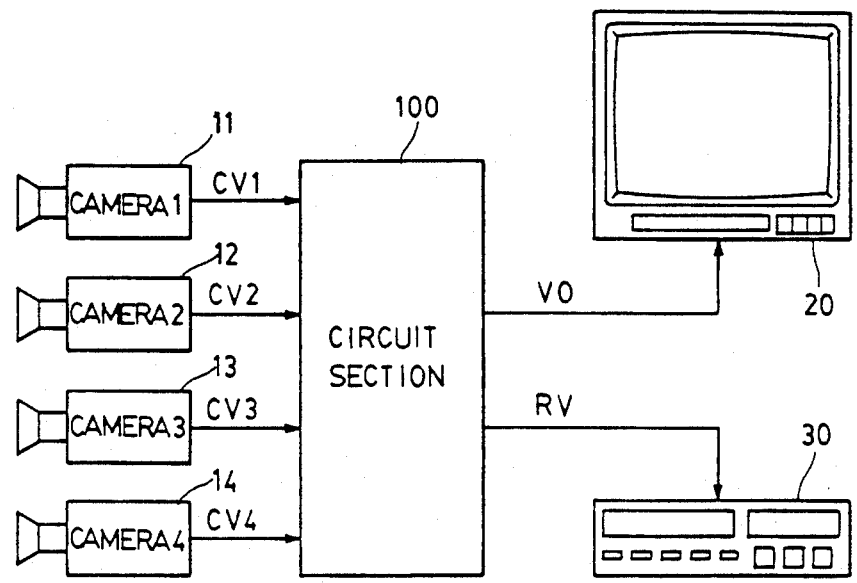
FIG. 1 is a block diagram for a system to which a divisional display four-screen system according to the present invention.

Referring now in detail to the drawings for the purpose of illustrating preferred embodiments of the present invention, an application system of the divisional display four-screen system as shown in FIG. 1 is constructed such that camera video signals $CV_1$-$CV_4$ which are outputted from four monitoring video cameras 11-14 are processed at a circuit section 100 according to the present invention and displayed on a television receiver 20 in four divisional screens, and one signal out of said camera video signals $CV_1$-$CV_4$ and said signals being applied to said television receiver 20 is selected and applied to a video cassette tape recorder 30 as a recording signal.

Figure 2:
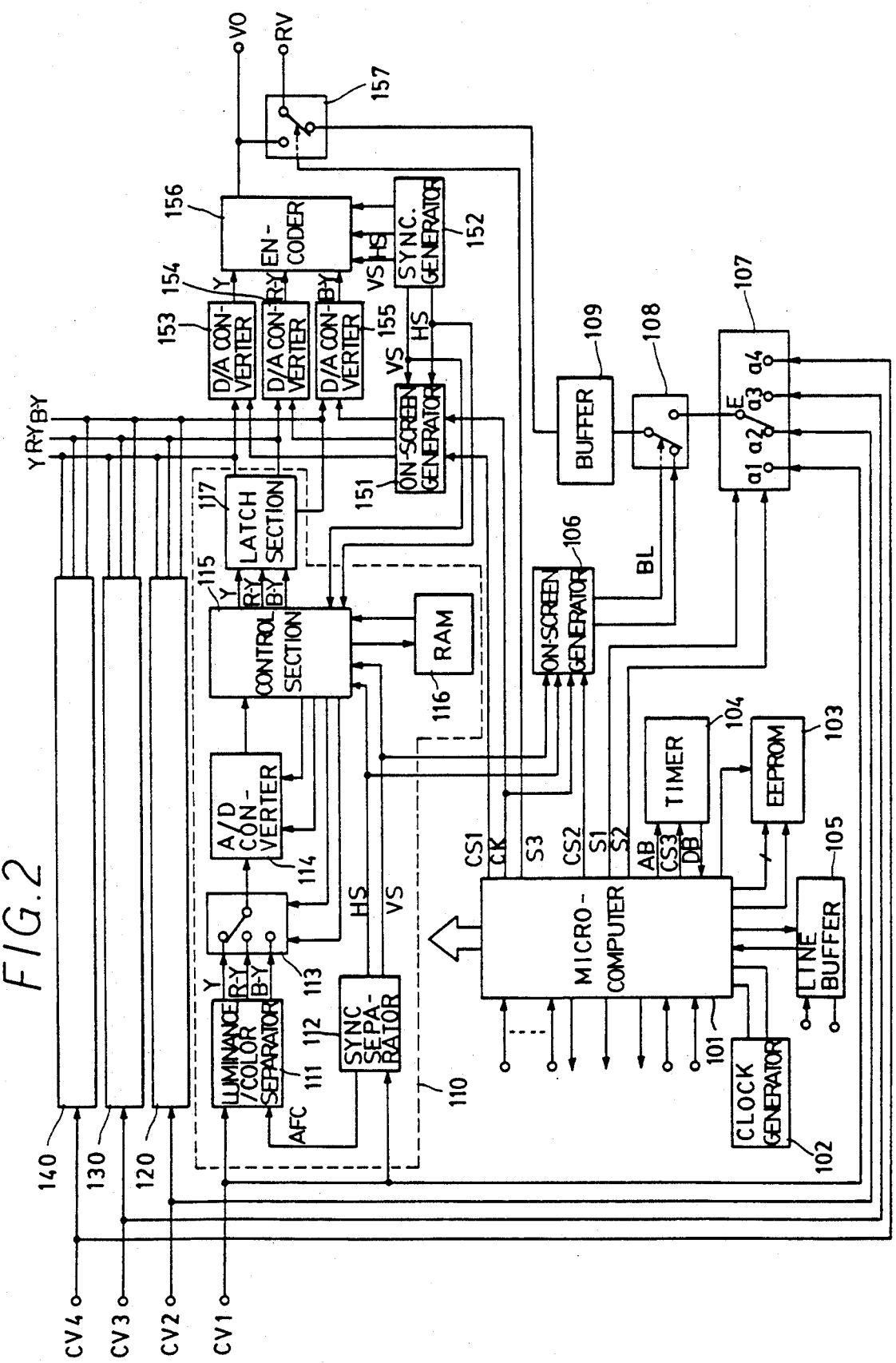
FIG. 2 is a detailed circuit diagram for the divisional display four-screen system of the present invention.

Referring to FIG. 2, a first video processing section 110 of the divisional display system for four-screen system according to the present invention comprises a luminance/color difference separator 111 for separating a camera video signal $CV_1$ into a luminance signal Y, and color difference signals $R-Y$, $B-Y$; a synchronous separator for separating the camera video signal $CV_1$ into a horizontal and vertical synchronous signals HS and VS, a selector 113 for selecting in sequence said luminance signal Y and color difference signals $R-Y$, $B-Y$; an analog/digital converter 114 for converting the output signal of the selector 113 into a digital signal; a control section 115 for controlling the operation of selector 113 and analog/digital converter 114, recording or storing in sequence the output signal of the analog/digital converter 114 to a RAM 116 under the control of a microcomputer 101 and outputting the recorded signal in a first divisional region scanning period of the television receiver 20; and a latch section 117 for temporary storing and outputting the output signals Y, $R-Y$ and $B-Y$. In addition, second, third and fourth video processing sections 120, 130 and 140 for processing camera video signals $CV_2$, $CV_3$ and $CV_4$ are so constituted as to output video signals, respectively, at the second, third and fourth divisional region scanning periods of the television receiver 20, in the same manner as the first video processing section 110.

The divisional display system for of the present invention comprises the first to fourth video signal processing sections 110, 120, 130 and 140 as described above, the microcomputer 101 for controlling each section, a clock signal generator 102 for applying clock signals to the microcomputer 101, an EEPROM 103 for storing various informations which have been processed at the microcomputer 101 by way of precaution against a power failure; a timer for producing and applying informations on year, month, date, a day of the week, hour, and second to the microcomputer 101; a line buffer for receiving from and transmitting to an external computer at the microcomputer 101; a synchronous generator 152 for producing synchronous signals HS and VS, and color burst signals; an ON-screen generator 151 for producing an ON-screen signal by being synchronized with the synchronous signals HS and VS of the synchronous generator 152 upon the control of the microcomputer 101; digital/analog converters 153 to 155 for converting the output signals of the first, second, third and fourth video signal processing sections 110, 120, 130 and 140 and of the ON-screen generator 151; an encoder 156 for synthesizing the output signals of the digital/analog converters 153-155 with the synchronous signals HS and VS of the synchronous generator 152 and the color burst signal to thereby make a synthetic video signal VO and then applying the synthetic signal VO to the television receiver 20; an ON-screen generator 106 for producing an ON-screen signal by being synchronized with the synchronous signals HS and VS of the synchronous separator 112 upon the control of the microcomputer 101; an analog switching section 107 for selecting one signal out of the camera video signals $CV_1$-$CV_4$ under the control of the microcomputer 101; a video signal synthesizing section 108 for synthesizing the ON-screen signal of the ON-screen generator 106 with the output signal of the analog switching section 107; a buffer 109 for amplifying the output signal of the video signal synthesizing section 108; and an analog switching section 157 for selecting one signal out of the output signals of the encoder 156 and of the buffer 109 under the control of the microcomputer 101 and applying the selected signal to the video cassette tape recorder 30 as a recording signal RV.

The operation and effect of the present invention will be described below in detail.

When camera video signals $CV_1$-$CV_4$ are outputted from monitoring video cameras 11-14, the video signal $CV_1$ (hereinafter, the operation of only one signal will be described) is separated into a luminance signal Y and color difference signals R−Y and B−Y at the luminance/color difference separator 111 and separated into a horizontal synchronous signal HS and a vertical synchronous signal VS at the synchronous separator 112 and then applied to the control section 115.

At this moment, the luminance signal Y and the color difference signals R−Y and B−Y are selected in sequence at the selector 113 under the control of the control section 115 and converted into digital signals at the analog/digital converter 114 under the control of the control section 115 and then applied to the control section 115. Accordingly, the control section 115 stores in sequence the output signals of the analog/digital converter 114 to the RAM 116 and then reads and outputs again the stored signals. At this time, the control section 115 reads and outputs the video signals Y, R−Y and B−Y at the first divisional region scanning period of the television receiver 20 upon the control of the microcomputer 101, and the video signals Y, R−Y and B−Y are temporarily stored at the latch section 117 and then outputted.

Further, the camera video signals $CV_2$, $CV_3$ and $CV_4$ are also processed at the second, third and fourth video processing sections 120, 130 and 140 in the same manner as the first video processing section 110 and then outputted at the second, third and fourth divisional region scanning periods of the television receiver 20.

The synchronous signals HS and VS and color burst signal are produced at the synchronous generator 152, and the ON-screen signal is produced at the ON-screen generator 151 by being synchronized with the synchronous signals HS and VS of the synchronous generator 152 under the control of the chip selection signal $CS_1$ and clock signal CK of the microcomputer 101.

Figure 3:
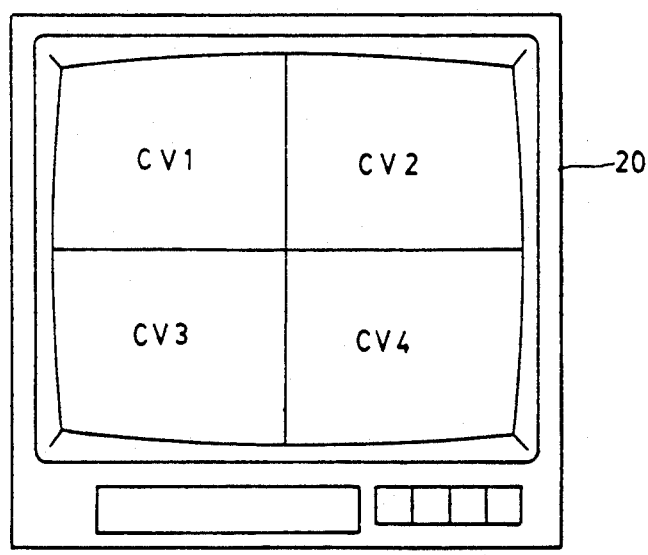
FIG. 3 is an explanatory view showing the display state of the four-screen display of the present invention.

On the other hand, the luminance signal Y, and color difference signals R−Y and B−Y which are outputted from the first, second, third and fourth video signal processing sections 110, 120, 130 and 140 at the first, second, third and fourth divisional region scanning periods of the television receiver 20 and the ON-screen signal which is outputted from the ON-screen generator 151, are converted into analog signals at the digital/analog converters 153, 154 and 155, and these converted signals are synthesized with the synchronous signals HS and VS and color burst signal of the synchronous generator 152 so as to be outputted as a synthetic signal VO. This synthesized video signal VO is applied to the television receiver 20, so that the video signals outputted from the first to fourth video signal processing sections 110, 120, 130 and 140 are displayed by dividing in four parts as shown in FIG. 3.

On the other hand, the microcomputer 101 receives a key signal to control each section of the system and information signals of year, month, date, time and the like are produced at the timer 104 by the address signal AB and chip selection signal $CS_3$ of the microcomputer 101 and applied to the microcomputer 101, the information signals processed at the microcomputer 101 being stored in the EEPROM 103 by way of precaution against a power failure, and the microcomputer 101 receiving and transmitting data from and to an external computer via the line buffer 105.

Furthermore, the ON-screen signal is generated at the ON-screen generator 106 by being synchronized with the horizontal and vertical synchronous signals HS and VS of the synchronous generator 112 under the control of the chip selection signal $CS_2$ and clock signal CK of the microcomputer 101, one signal being selected at the analog switching section 109 out of the camera video signals $CV_1$-$CV_4$ in response to the selection signals $S_1$ and $S_2$ of the microcomputer 101 and synthesized with the ON-screen signal by the blanking signal of the ON-screen generator 106 at the video signal synthesizer 108, and the output signal of the video synthesizer 108 is amplified and outputted at the buffer 109.

The signal outputted from the buffer 109 and the synthetic video signal VO outputted from the encoder 156 are selected at the analog switching section 157 by the selection signal $S_3$ of the microcomputer 101 and then applied to the video cassette tape recorder 30 as a recording signal.

On the other hand, the microcomputer 101 produces an alarm sound when an abnormal-state signal is detected, and at this moment the microcomputer 101 outputs selection signals $S_1$ and $S_2$ such that the camera video signal of the abnormal-state among the camera video signals $CV_1$-$CV_4$ is selected at the analog switching section 107. At this moment, the microcomputer 101 outputs the selection signal $S_3$ for selecting the output signal of the buffer 109 so that the camera video signal selected at the analog switching section 107 is applied to the video cassette tape recorder 30 as a recording signal through the video signal RV synthesizing section 108, buffer 109 and analog switching section 157. And, the recording signal RV is applied to a monitor or the like so that the camera video signal in the abnormal-state is displayed on the monitor.

In addition, the microcomputer 101 outputs and displays the key signal and a luminance display signal in response to the present condition of the system.

As described above in detail, the present invention has the effect that since the video signals inputted from four monitoring cameras are displayed on one television screen by dividing in four parts at one time, more effective monitoring is possible and a camera video signal in an abnormal-state can be selected and recorded to display on a monitor, so that almost perfect monitoring operations are carried out.

What is claimed is:

1. A system for divisionally displaying four images on a monitor screen comprising:

a microcomputer;

first to fourth video signal processing sections for separating camera video signals from four cameras into a luminance signal and color difference signals, respectively, for latching the signals after converting same into digital signals, and for outputting the digital signals during first to fourth divisional region scanning periods of the monitor under control of the microcomputer;

a synchronous generator for producing synchronous signals and color burst signals;

an ON-screen generator for producing an ON-screen signal by being synchronized with the synchronous signals of the synchronous generator under the control of the microcomputer;

digital/analog converters for converting the output signals of the first to fourth video signal processing sections and the output signal of the ON-screen generator into analog signals; and an encoder for synthesizing a synthetic video signal from the output signals of the digital/analog converters with the synchronous signals of the synchronous generator and the color burst signals and then outputting said synthetic video signal.

2. The system as claimed in claim 1, wherein each of said first to fourth video signal processing sections comprises a synchronous separator for separating the respective camera video signal into horizontal and vertical synchronous signals; a selector for selecting in sequence the luminance signal and the color difference signals; an analog/digital converter for converting the output signal of the selector into a digital signal; a control section for controlling the operation of the selector and the analog/digital converter, for storing in sequence the output signals of the analog/digital converter to a RAM under the control of the microcomputer, and for outputting the stored signals during the respective divisional region scanning period of the monitor screen; and a latch section for latching temporarily and outputting the output signal of the control section.

3. The system as claimed in claims 1 or 2, wherein the system further comprises an analog switching section for selecting and outputting one signal out of the camera video signals under the control of the microcomputer; a video signal synthesizing section for synthesizing the ON-screen signal of the ON-screen generator with the output signal of the analog switching section; a buffer for amplifying the output signal of the video signal synthesizing section; and an analog switching section for selecting one signal out of the output signals of the encoder and buffer under the control of the microcomputer and recording the selected signal.

4. A system for divisionally displaying plural images on a monitor screen comprising:

a microcomputer;

plural video signal processing sections for separating camera video signals from four cameras into a luminance signal and color difference signals, respectively, for latching the signals after converting same into digital signals, and for outputting the digital signals during plural divisional region scanning periods of the monitor under control of the microcomputer;

a synchronous generator for producing synchronous signals and color burst signals;

an ON-screen generator for producing an ON-screen signal by being synchronized with the synchronous signals of the synchronous generator under the control of the microcomputer;

digital/analog converters for converting the output signals of the plural video signal processing sections and the output signal of the ON-screen generator into analog signals; and an encoder for synthesizing a synthetic video signal from the output signals of the digital/analog converters with the synchronous signals of the synchronous generator and the color burst signals and then outputting said synthetic video signal.

* * * * *